June 14, 1932.    J. L. SHAPIRO    1,863,230
DENTAL BRIDGEWORK ATTACHMENT DEVICE
Filed Jan. 9, 1931    2 Sheets-Sheet 2
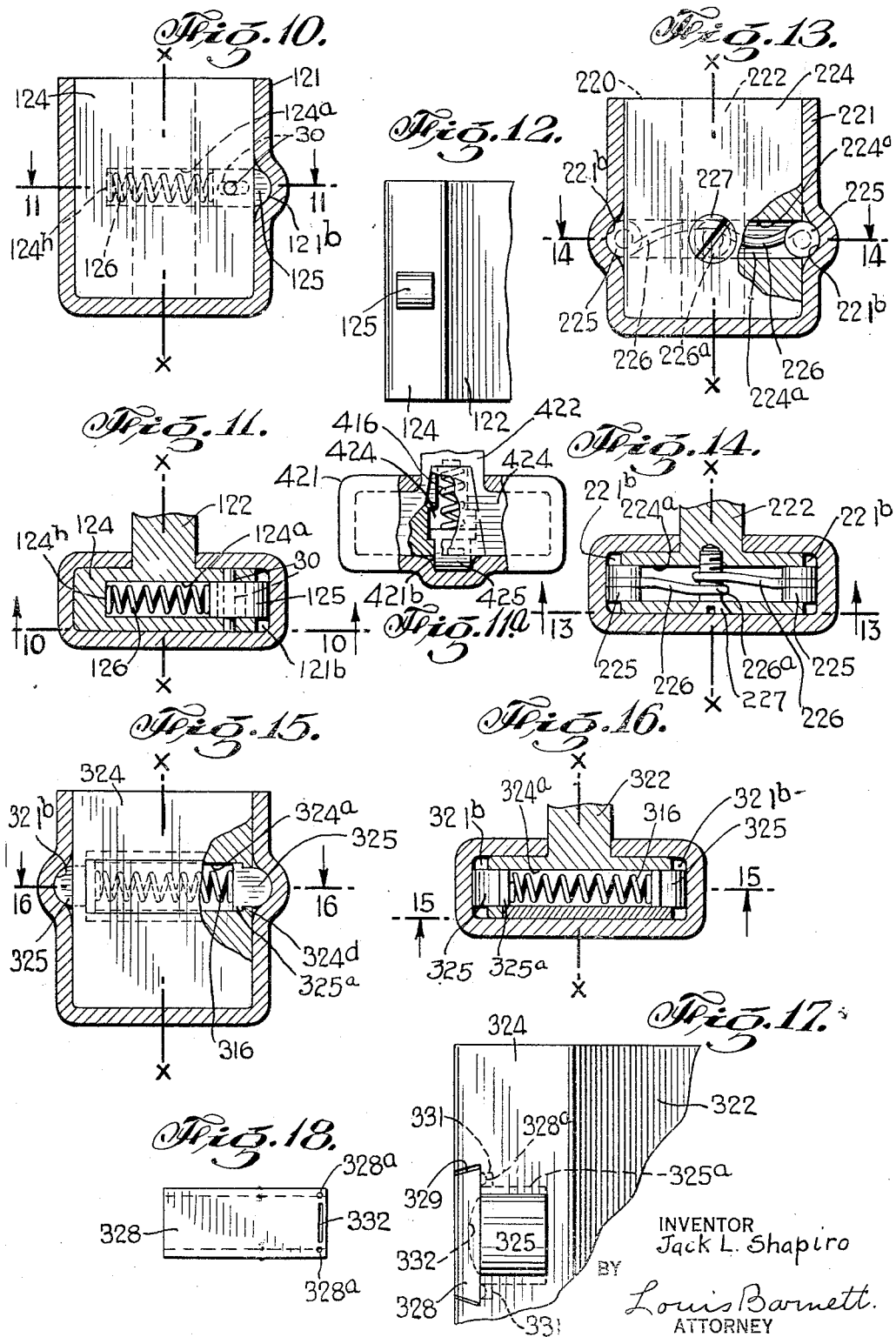
INVENTOR
Jack L. Shapiro
BY
Louis Barnett.
ATTORNEY Patented June 14, 1932

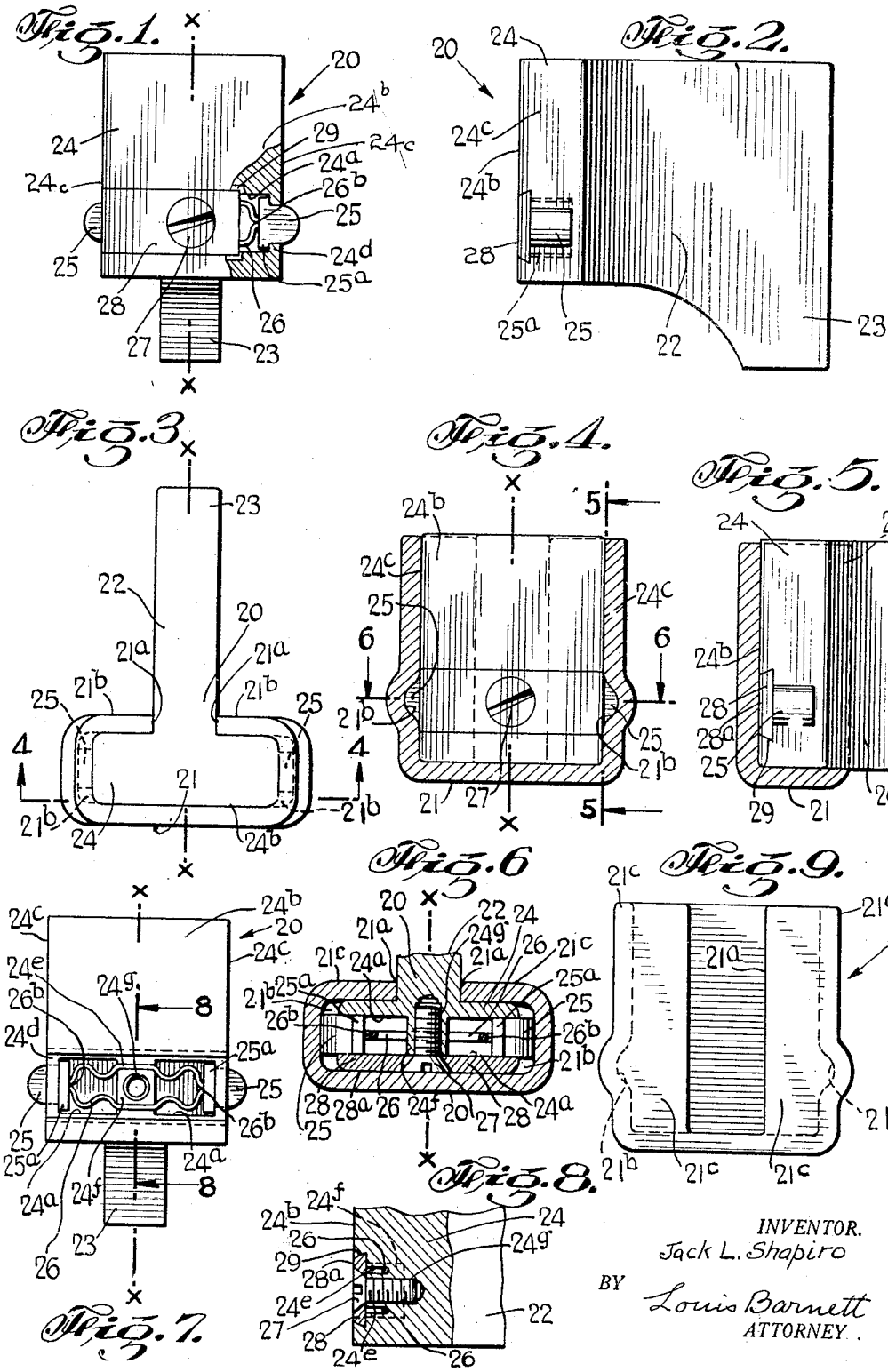

1,863,230

UNITED STATES PATENT OFFICE

JACK L. SHAPIRO, OF NEW YORK, N. Y.

DENTAL BRIDGEWORK ATTACHMENT DEVICE

Application filed January 9, 1931. Serial No. 507,589.

This invention relates to removable dental bridgework.

Among the objects of the invention is to generally improve dental bridgework constructions by providing novel, releasable attachments for retaining a removable artificial denture against accidental displacement from position between abutment natural teeth which shall comprise few and simple parts forming a strong, compact and rugged structure, which shall facilitate mounting and removal of the bridgework, which shall provide a self-interlocking, reliable supporting and fastening means for the bridgework, and which shall be cheap to manufacture, and practical and efficient to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawings, in which is shown various possible illustrative embodiments of this invention.

Fig. 1 is a front elevational view of a male attachment member constructed to embody the invention, partly broken away to expose the normally covered portions thereof.

Fig. 2 is a side elevational view of the improved male member shown in Fig. 1.

Fig. 3 is a top plan view showing the improved male attachment member interlocking with a companionate female attachment member embodying the invention.

Figs. 4, 5 and 6 are cross-sectional views taken on lines 4—4 in Fig. 3 and lines 5—5 and 6—6, in Fig. 4, respectively.

Fig. 7 is a front elevational view similar to Fig. 1 with the cover plate removed showing the interior construction.

Fig. 8 is a fragmentary cross-sectional view taken on lines 8—8 in Fig. 7.

Fig. 9 is a rear elevational view of the improved female attachment member with the male attachment member removed therefrom.

Fig. 10 is a cross-sectional view of a modified form of the invention showing a single spring catch bolt interlocking the improved male and female attachment members corresponding to a section taken on lines 10—10 in Fig. 11.

Fig. 11 is a cross-sectional view taken on lines 10—10 in Fig. 10.

Fig. 11a is a bottom plan view of another improved form of the invention showing a single spring catch bolt mounted in alignment with the shank for interlocking the male and female attachment members, parts of the male and female members being broken away to expose the interior construction.

Fig. 12 is a fragmentary side elevational view of the male attachment member shown in Fig. 10 removed from the female attachment member.

Fig. 13 is a front elevational view of another modification of improved interlocked male and female attachment members embodying the invention corresponding to a section taken on lines 13—13 in Fig. 14, and showing the male member broken away to expose normally covered portions thereof.

Fig. 14 is a cross-sectional view taken on lines 14—14 in Fig. 12.

Figs. 15 and 16 are views similar to Figs. 13 and 14 of still another modified construction of the invention taken on lines 15—15 in Fig. 16 and lines 16—16 in Fig. 15, respectively.

Fig. 17 is a fragmentary side elevational view of the male attachment member shown in Fig. 15 removed from the female attachment member, partly broken away to expose the sliding cover limiting stop means.

Fig. 18 is a rear elevational view of a sliding cover plate used in the modified construction of the invention shown in Figs. 15, 16 and 17.

Referring in detail to the drawings, 20 and 21 denote male and female members, respectively, of an attachment embodying the invention for retaining and supporting artificial dentures, such as removable bridgework, in position between abutment natural teeth (not shown), said male and female attachment members interlocking, as is clearly shown in Figs. 3 to 6, inclusive.

The male member 20 includes a shank 22 which preferably is adapted to have one end 23 fixedly anchored in the removable bridgework so as to project the other integrally formed end or terminal lug 24 for interlocking with the companionate female member 21 which provides a socket therefor. Said shank 22, lug 24 and the female socket member 21 may be made of a suitable tough metal or alloy having a high tensile, compressive and torsional resistant strength and being non-corrosive when in contact with food and digestive juices in the mouth. Said shank, lug and socket members, consequently, form a rugged interlocking structure capable of withstanding all stresses and strains to which bridgework attachments may be subjected in use.

The female socket member 21, as shown in Fig. 6, may be made with relatively thin walls and is shaped to receive the terminal lug 24, said socket member being provided with a slot 21a in the rear wall 21c of said member to permit passage of the shank 22 for slidably fitting the lug 24 into the socket member 21 (see Figs. 3 to 6, inclusive). Socket members 21 preferably are incorporated in the natural abutting teeth (not shown) while the male members 20 are associated with the removable bridgework (not shown) in the well understood manner. It is to be understood that a reversed arrangement of male and female members may be employed if desired. When the male members 20 are anchored to the removable bridgework, the female members 21 are rigidly embedded in suitable shallow inlays (not shown) provided in coronal sections of the natural teeth in the well understood manner.

One dominant feature of the invention is the provision of an improved catch or latching means incorporated in the structure of said attachment members 20 and 21 for retaining said members from being separated thereby retaining the removable bridgework in position and against accidental dislodgment. Said catch or latching means may comprise one or more shoes or bolts 25 which are slidably mounted in a groove or undercut guide passage 24a. Said groove extends inwardly of the front surface 24b of the lug 24 in a transverse direction in respect to a central axis plane X—X of the shank 22 so that the shoes or bolts 25 project laterally beyond the opposite side surfaces 24c of the lug 24. Said bolts 25 are slidably mounted to extend through the open opposite ends of said grooves 24a and suitable means such as an inwardly extending flange 24d may be provided on each of said groove ends which serve as stops for engaging a ledge 25a provided on the inner end of each shoe or bolt 25 for limiting the outward movement of the latter.

The bolts 25 are preferably neatly fitted to provide closures for said opposite ends of the grooves 24a so as to prevent food particles or other foreign matter from entering the grooves.

For urging the bolts 25 to their extreme outwardly extending positions, any suitable means, such as springs 26, may be provided. Said springs, as shown in Figs. 1, 6, 7 and 8, preferably have their outer ends 26b attached to or abutted against the inner ends of bolts 25, the mid-section of said springs 26 being anchored in slots 24e of a central cross-web 24f, extending in the grooves 24a in alignment with the central axis plane X—X. Said web 24f may be provided with a tapped hole 24g for receiving a screw 27, the latter serving to retain a plate cover 28 which forms a wall closure for the groove 24a. Said plate 28 preferably has a dove-tail sliding joint 29 for positively retaining the plate in position with the lug front surface 24b, as is clearly shown in Fig. 8.

For co-operating with the spring actuated bolts 25, pockets 21b are provided in the opposite walls 21c of the female member 21. Said pockets are preferably formed by outwardly pressing material of said walls 21c and are positioned so as to releasably engage and lock said male attachment member 20 against dislodgment when the lug 24 is fully entered into the female socket member 21, as is clearly shown in Figs. 3, 4 and 6.

The practical application of the invention is now apparent. After embedding the female members 21 in coronal sections of the natural abutting teeth in proper alignment to receive the male members 20 projecting from opposite ends of the removable bridge (not shown) in the well understood manner, the lugs 24 are simply inserted into the socket members 21 until they are fully entered. The spring pressed bolts 25 will then be projected in the pockets 21b and will retain the enlockment of the male in the female attachment members for holding the removable bridgework against accidental separation and in proper alignment with the natural teeth. Mastication cannot dislodge the bridgework because the bolts 25 in the pockets 21c hold said male in the female attachment member.

The above described improved attachment members permit the ready mounting and removal of the bridgework by simply withdrawing the lug 24 from the socket 21c against the action of the bolts 25 which are constructed to ride in and out of the pockets 21b. The spring pressed bolts 25 serve to retain the adjustment of the lug 24 in the socket 21 by taking up any appreciable looseness or wear. For excessive looseness or wear, the bolts 25 may be readily replaced for tightening the enlockment of the male and female attachment members without requiring any other additional alterations or replacements of parts.

The bolts 25 and the springs 26 may each be made of material best suited for the purposes for which they are used. The springs 26 may therefore be made of relatively tough resilient material and the bolts 25 of a material that is relatively softer than that from which the socket member 21 is made, so that the replaceable bolts 25 alone wear. Thus, the improved assembly of various parts of the attachment members 20 and 21 can be selectively made of materials which are most serviceable for the purposes required in actual use.

In Figs. 10, 11, and 12, there is shown a modified construction of the attachment members embodying the invention. Here the female member 121 is formed with a single pocket 121b for co-operating with a single shoe 125. The latter is reciprocatingly mounted in a passage 124a provided in the lug 124 of the male member 122. A compression spring 126 is provided between the bolt 125 and the dead end 124h of the passage 124a for projecting the bolt 125 to its outermost position. The latter is limited in its reciprocating movement by any suitable means such as the slot-pin connection 30. In this construction, of the invention, the use of a closure plate 28 for the groove 24a and screw 27 such as used in the form shown in Fig. 1 is eliminated.

In Fig. 11a, another form of the invention is shown in which a single spring catch bolt is used. Here the female member 421 is interlocked with the lug 424 of the male member and said enlockment is held from accidental disengagement by the bolt 425 which is mounted for reciprocating movement in a passage 424a in alignment with the shank 422 of the male member. The spring 416 retains the bolt in its extended position, the latter being projected in the outwardly extended pocket 321b provided in the front side of the female member 421. Thus this form is similar to that described above and shown in Figs. 10, 11 and 12 with the exception that the pocket and bolt are disposed in alignment with the shank of the male member instead of being positioned laterally thereof.

Another modification of the invention is shown in Figs. 13 and 14. Here the lug 224 of the male member 220 is provided with a through passage 224a which extends transversely with respect to the central axis X—X of the shank 220. The bolts 225 terminate the opposite ends of a wire spring 226, the center of said spring being looped at 226a about a fastening screw 227 which retains the spring and bolts within the through passage 224a and permits said bolts to reciprocate therein for engaging in the pockets 221b of the socket members 211 in the same manner as described above for the male and female members 20 and 21, respectively, shown in Fig. 3. In this modified construction, the mounting of the bolts 225 are simplified and no cover plate is required as in the construction described above and shown in Fig. 1.

Still another modification of the invention is shown in Figs. 15 to 17 inclusive. Here a cover plate 328 is provided for sliding in a dove-tail joint 329 in the manner similar to that described above for the male and female members 20 and 21, respectively, shown in Figs. 1, 2 and 8, but the web 24f and the screw 27 are eliminated. The bolts 325 are identical with the bolts 25 of said first described construction, the groove 324a being provided with flanges 324d and the bolts 325 with ledges 325a. The spring 316 here may be of the compression type and extends between the spaced bolts 325. The cover plate 328 is provided on its under side with a pin or pins 328a which enter recesses 331 in the lug 324 for limiting the sliding movement of said cover plate 328. A finger nail shot 332 may be provided in the cover plate 328 to facilitate applying and removing said cover.

Each of the modifications described above provide an improved catch or latching means incorporated in the attachment members for holding the latter from against separation and thereby are adapted to retain the removable bridgework against accidental dislodgment. Each of said modifications may be practically applied in the same manner as described above for the attachment male and and female members 20 and 21, respectively.

It will thus be seen that there is provided means whereby the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawings, is to be interpreted as illustrative and not in a limiting sense.

Having thus described my invention, I claim as new and desire to secure by Letters Patent:

1. In a dental bridgework attachment device, a male member having a lug adapted to interlock with a companionate female member, said lug having a groove, a cover plate forming a closure wall for said groove, the outer surfaces of said plate being flush with a front surface of the lug, projecting means movably mounted in said groove extending beyond a side surface of said lug adapted to engage with said female member.

2. In a dental bridgework attachment device, a male member having a lug adapted to interlock with a companionate female member, said lug having a groove, a cover plate forming a closure wall for said groove, the outer surfaces of said plate being flush with a front surface of the lug, projecting means moveably mounted in said groove to extend beyond a side surface of said lug adapted to engage with said female member, and fastening means for retaining the cover plate against movement with respect to the lug.

In testimony, I affix my signature.

JACK L. SHAPIRO.